Figure 1:
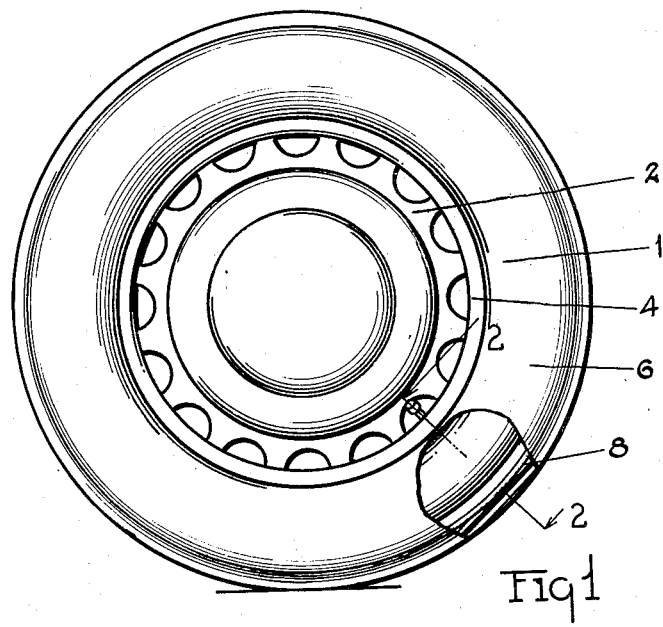

May 14, 1940.　　　J. P. CROWLEY　　　2,200,916
PNEUMATIC SAFETY TIRE
Filed Nov. 22, 1938

Inventor
Joseph P. Crowley
By Faust F. Crampton
Attorney

Patented May 14, 1940

2,200,916

UNITED STATES PATENT OFFICE 2,200,916

PNEUMATIC SAFETY TIRE

Joseph P. Crowley, Toledo, Ohio

Application November 22, 1938, Serial No. 241,836

2 Claims. (Cl. 152—342)

My invention relates generally to a vehicle wheel tire construction and particularly to a safety tire which has means for entrapping a pneumatic medium within the body of the tire to enable the successful performance of its function.

The invention has for an object to provide a pneumatic safety tire of a minimum of parts and weight to, thus, reduce the time required for assembly thereof with the vehicle and to minimize the useless or non-paying load moved by the power means of the vehicle. In this connection, the invention provides a pneumatic safety tire including a tubular casing having a pneumatically impenetrable cleat or tread-bearing wall and adjoining side walls, the side walls being joined together by a felloe engaging wall to form a toroidal chamber within the casing. As an integrated part of said casing, there is provided a flexible hollow toroid member of limited expandibility which extends through a portion of said toroidal chamber. The toroid member may be pneumatically charged through an orifice which extends through the walls of the casing and toroid member. The toroid member gives of its pneumatic charge to the interior of the casing through a second orifice formed in the wall of the toroid member. The pneumatic charge, thus, given the casing causes its distention to locate certain of the walls of said casing in spaced relation to certain of the walls of said toroid member. Thus, it will be observed that my invention dispenses with the heretofore required assembly of an inner tube with the casing, as a preliminary to mounting the casing on the vehicle wheel and, in eliminating the need for the conventional inner tube, reduces the useless and non-paying load required to be moved by the vehicle power means.

The invention has for a further object to provide a pneumatic safety tire having the additional safety feature, not found in the tire constructions known to the art, of maintaining the casing in mounted position on the felloe of the vehicle wheel, notwithstanding collapse of said casing walls, due to puncture thereof, or the high speed at which the wheel may be rotating at the time of said collapse. As is known to those skilled in the art, collapse of said casing walls in tires of the construction known to art renders said casing freely susceptible to the effects of the centrifugal forces produced by continued rotation of the vehicle wheel at high speeds, after the tire casing has collapsed. The centrifugal forces, thus developed, tend to draw the tread portion of the casing radially with respect to the vehicle wheel producing, by reason of the fact that the casing clincher beads are no longer pneumatically sustained by the inner tube to a full normal spread and in tight engagement with the clincher rings of the vehicle wheel, movement of the casing clincher beads toward each other and away from the clincher rings freeing the casing from the vehicle wheel. Ofttimes, freeing of the casing results in "throwing" or separation of the casing from the wheel and the attendant dangers of loss of traction control over the vehicle resulting therefrom. My invention provides a hollow toroid member of limited expandibility and chargeable with an impressed pneumatic medium connected to, preferably by bodily integration with, the felloe engaging wall of the casing disposed in spaced relation to the tread-bearing wall of said casing and approximating the shape and dimension of the vehicle wheel felloe. In the toroid member, there is provided a means resisting the movement of the casing with reference to the vehicle wheel. Not only is movement of the casing relative to the vehicle wheel by slippage, due to the torque forces exerted through the vehicle wheel resisted, but, also, the "throwing" or separation of the casing from the wheel on collapse of the casing is prevented, the toroid member, in its expansion, operating, by reason of the pneumatic pressure within the toroid member, to clamp the casing to the wheel felloe, independently of the expanded or collapsed condition of the casing at the time.

The invention, further, provides an inflated toroid member of the character referred to above which is positively and firmly positioned between the casing side walls bearing the clincher beads so that the pneumatic pressure within the member resists movement of the clincher beads from clincher ring engagement, when the wall of the casing has been punctured and collapses. The maintained distension of the toroid member, therefore, resists the movement of the clincher beads to free the casing from the clincher rings of the vehicle wheel on collapse of the casing.

The invention consists in other features and advantages which will appear from the following description and upon examination of the accompanying drawing. Structures containing the invention may partake of different forms and still embody the invention. To illustrate a practical application of the invention, I have selected a pneumatic safety tire as an example of the various structures and details thereof that contain the invention and shall describe the selected structure hereinafter, it being understood that variations may be made without departing from the spirit of the invention. The particular structure selected is shown in the accompanying drawing and described hereinafter.

Figure 2:
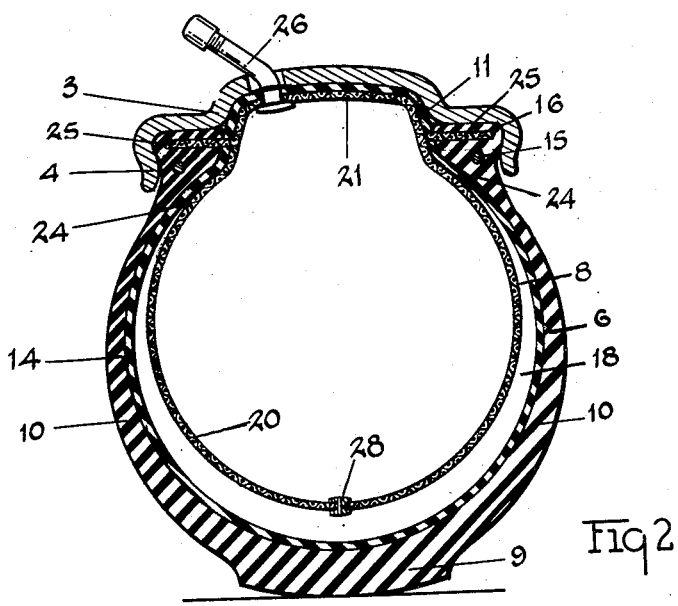

Fig. 1 of the accompanying drawing illustrates a side view of a pneumatic safety tire embodying the features of my invention, a part thereof being shown broken away to better illustrate other parts thereof. Fig. 2 illustrates a view of a section taken along the plane of the line 2—2 indicated in Fig. 1.

A pneumatic safety tire 1 embodying the features of my invention is adapted to be mounted on a vehicle wheel, such as the wheel 2, having the usual felloe 3 and clincher rings 4. The pneumatic safety tire 1 includes a tubular casing 6 and a hollow toroid member 8 connected to and associated with said casing 6.

The tubular casing 6 is, preferably, formed of rubber or other like material reinforced by a cord fabric or other like material embedded in the rubber so as to form pneumatically impenetrable casing walls. The casing walls include a cleat or tread-bearing wall 9, side walls 10 and a felloe-engaging wall 11. The felloe-engaging wall 11 may be formed as an extension of and adjoining said side walls 10 or, preferably, as shown in the accompanying drawing, the felloe-engaging wall 11 may be formed as an extension of the gum rubber lamina 14 conforming and integrated with the inner surfaces of the casing walls and providing a further precautionary and contributing means insuring the pneumatic impenetrability of the casing 6. The casing may have the usual reinforcing bead wire cores 15 around which the usual clincher beads 16 of the casing are formed at the line of jointure of each of the side walls 10 with the felloe-approximating wall 11. The walls of the casing 6 define a substantially toroidal chamber 18 within the casing.

Within the chamber 18 is disposed the toroid member 8. The toroid member 8 is formed of rubber or other like material in which is embedded a cord fabric or other like material to form a flexible major body wall 20 of limited expandibility and a felloe-approximating wall 21. The toroid member 8 is connected to the casing 6. Preferably, the wall 21 of the member 8 is integrated with the felloe-engaging wall 11 of the casing. By such integration, the toroid member 8 is maintained in an established desired relation to the casing 6. If desired, a portion of the toroid wall 20 intermediate the points, indicated at 24 in Fig. 2 of the accompanying drawing, and the wall 21 of the member 8 may be likewise integrated with a portion of each of the side walls 10 of the casing 6. It will be noted that, by such integration, the portions of the side walls 10 and the clincher beads 16 borne thereby are made directly responsive to the distension of the toroid member 8. Further, in this connection the toroid member 8 is, preferably, provided with outstanding flanges 25, and, like the toroid member, are formed of rubber or other like material, in which is embedded a cord fabric or other like material. In the construction of the casing, each flange is incorporated and embedded in one of the beads 16 and forms a complementary core part around which the bead may be formed. Said flanges 25, also, reinforce the desired connection between the member 8 and the casing 6 and insure response of the beads 16 to the distension of the member 8.

By the described positioning of the member 8 in the chamber 18, the wall 20 of said member will be located in spaced relation to the tread-bearing wall 9 and portions of the side walls 10 of the casing adjacent thereto, when the casing is distended. The casing 6 is caused to distend by the introduction of a pneumatic medium, under pressure, into the space between the member 8 and the casing walls and into the member 8 itself. The pneumatic medium may be introduced into the member 8 through an orifice formed in a suitable ball-check valve 26. The body of the valve 26, preferably, extends through the wall 11 of the casing and the wall 21 of the member 8. The space between casing walls and the member 8 receives its charge of the impressed pneumatic medium through an orifice 28 formed medially in the wall 20 of the member 8 and adjacent to the tread-bearing wall 9 of the casing 6. The orifice 28 is of a small dimension 20 so that passage of the pneumatic medium outwardly with respect to the interior of the member 8, will be hampered and slow. Thus, when the tread wall 9 or portions of the side walls 10 adjacent thereto are punctured, as by the penetration of a sharp instrument through said casing walls, primarily, only the pneumatic medium contained in the space between the member 8 and the casing walls will escape. With the escape of the pneumatic medium from said space, the casing 6 will partially collapse being restrained against complete collapse by the maintained distension of the toroid member 8 produced by the pressure of the pneumatic medium therein. The support of the punctured casing 6 will continue until such time as the pneumatic medium within the member 8 passes through the orifice 28 and escapes through the punctured wall of the casing 6. If, at the time of said puncture, the vehicle wheel is revolving at some speed, the pneumatic pressure within the distended member 8 not only serves to support the partially collapsed casing 6 but, also, acts to maintain the clincher beads 16 at full spread and in engagement with their respective clincher rings 4 of the wheel 1. The pneumatic pressure within the member 8 further serves to clamp and bind the partially collapsed casing 6 to the felloe of the wheel until the pneumatic medium within the member 8 has passed to the atmosphere through the orifice 28, during which time the vehicle operator has had an opportunity to reduce the speed of the vehicle or bring it to a stop without the danger of throwing the casing 6 from the vehicle wheel. The relation of the orifice 28 and lamina 14 is advantageously utilized to extend the period of maintained distension of the member 8, after puncture of the casing 6. With each revolution of the vehicle wheel, the gum rubber lamina 14 will be pressed over and momentarily close the orifice 28 to, thus, further extend said period of maintained distension of the member 8.

While in accordance with the provisions of the statutes, I have illustrated and described the best form of my invention now known to me, those skilled in the art will readily understand that many changes may be made in the form of construction disclosed, without departing from the spirit of my invention as set forth in the appended claims.

I claim:

1. A pneumatic safety tire comprising a pair of interjoined distensible toroid members, one of said members having pneumatically impenetrable tread and side walls and a felloe-engaging wall joining said side walls; a clincher bead formed at the line of jointure of said side and felloe-engaging walls; the other of said toroid members having a felloe-approximating wall and an integral flange extension formed on either side of said felloe-approximating wall; each flange extension extending into and forming an embedded core part of one of said clincher beads to locate the felloe-approximating wall of said other toroid member in registration with the interior of said felloe-engaging wall of said first toroid member; a valve orifice extending through a wall of said first and second toroid members, providing communication between the exterior of the first toroid member and the interior of said second toroid member; and an orifice formed in the wall of said second toroid member, providing free communication between the interiors of said second and first toroid members.

2. A pneumatic safety tire including a distensible tubular casing having pneumatically impenetrable tread and side walls and a felloe-engaging wall joining said side walls; a clincher bead formed at the line of jointure of said side and felloe-engaging casing walls; a distensible hollow toroid member of limited expandibility disposed within the casing and having a flange extension; said flange extension extending into and embedded within one of said clincher beads; a valve orifice extending through a wall of said casing and said toroid member, providing a communication between the exterior of the casing and the interior of said toroid member; and an orifice formed in the wall of said toroid member, providing free communication between the interior of said toroid member and said casing.

JOSEPH P. CROWLEY.